US006799596B2

(12) United States Patent
Liebert

(10) Patent No.: US 6,799,596 B2
(45) Date of Patent: Oct. 5, 2004

(54) BREAKAWAY SAFETY SHUT-OFF VALVE

(75) Inventor: Jeffrey W. Liebert, New Salisbury, IN (US)

(73) Assignee: Electromechanical Research Laboratories, Inc., New Albany, IN (US)

( * ) Notice: Subject to any disclaimer, the term of this patent is extended or adjusted under 35 U.S.C. 154(b) by 227 days.

(21) Appl. No.: 10/074,341

(22) Filed: Feb. 12, 2002

(65) Prior Publication Data

US 2003/0150486 A1 Aug. 14, 2003

(51) Int. Cl.[7] .............................................. F16K 17/36
(52) U.S. Cl. ...................................... 137/68.14; 137/71
(58) Field of Search ............................. 137/68.14, 71

(56) References Cited

U.S. PATENT DOCUMENTS

| | | | | |
|---|---|---|---|---|
| 2,898,926 A | * | 8/1959 | Tsiguloff ................. | 137/68.14 |
| 4,056,117 A | * | 11/1977 | Deeks ..................... | 137/68.14 |
| 4,064,889 A | | 12/1977 | Gayle et al. | |
| 4,077,422 A | * | 3/1978 | Brinkley et al. ........ | 137/68.14 |
| 4,625,746 A | | 12/1986 | Calvin et al. | |
| 4,762,140 A | * | 8/1988 | Davis ...................... | 137/71 |
| 4,907,617 A | * | 3/1990 | Whalen .................. | 137/71 |
| 5,103,852 A | * | 4/1992 | Jones et al. ............. | 137/71 |
| 5,144,973 A | * | 9/1992 | Green et al. ............ | 137/71 |
| 5,186,202 A | | 2/1993 | Meisenheimer, Jr. | |
| 5,305,776 A | | 4/1994 | Romano | |
| 5,351,708 A | | 10/1994 | Donato et al. | |
| 5,758,682 A | | 6/1998 | Cain | |
| 6,178,982 B1 | * | 1/2001 | Longstreth ............. | 137/68.14 |
| 6,209,569 B1 | | 4/2001 | Sharp | |

\* cited by examiner

Primary Examiner—John Rivell
(74) Attorney, Agent, or Firm—Woodard, Emhardt, Moriarty, McNett & Henry LLP

(57) ABSTRACT

A breakaway safety shut-off valve including a valve housing and a detachable end portion connected thereto by a region of reduced strength. The housing includes an axial passage and the detachable portion includes an annular shoulder positioned adjacent the region of reduced strength. A ball is guidably displaceable along a circumferential surface of the axial passage between an open position and a closed position, with a spring engaged between the valve housing and the ball to urge the ball toward the closed position. An insert having a plurality of arm segments is engaged between the ball and the annular shoulder to initially maintain the ball in the open position. At least partial detachment of the detachable portion along the region of reduced strength causes at least one of the arm segments to disengage the annular shoulder to permit the spring to displace the ball toward the closed position.

27 Claims, 8 Drawing Sheets

BREAKAWAY SAFETY SHUT-OFF VALVE

FIELD OF THE INVENTION

The present invention relates generally to the field of safety valves, and more particularly relates to a safety valve having a breakaway portion that when at least partially detached from the remainder of the valve triggers a shut-off condition.

BACKGROUND OF THE INVENTION

Various types of valve mechanisms have been used in the past to provide a means for automatically shutting off a valve that has been physically damaged. Such damage may be inflicted either inadvertently or intentionally. Inadvertent damage might occur, for example, when a valve is hit by a motorized vehicle or jarred by a natural physical force such as an earthquake or storm. Intentionally damage might occur, for example, when someone with bad intentions, such as a vandal or terrorist, exerts a destructive force onto the valve. In either case, a valve that has been extensively damaged or which has been either partially or entirely removed from its original operating location can pose a significant threat to the surrounding environment. This is particularly true when the valve is used in association with materials that are flammable and/or hazardous. Such materials might include, for example, liquefied petroleum, natural gas, propane gas, hazardous chemicals, or other flammable and/or hazardous materials. It is desirable that valves that are susceptible to damage have automatic shut-off capabilities to prevent the escape of dangerous liquids and/or gases to the surrounding environment.

While prior attempts have been made to provide a safety shut-off valve that automatically shuts off in the event that the valve becomes physically damaged, such devices are typically over-complex, unreliable, and relatively expensive. Thus, there is a general need in the industry to provide an improved breakaway safety shut-off valve. The present invention satisfies this need and provides other benefits and advantages in a novel and unobvious manner.

SUMMARY OF THE INVENTION

The present invention relates to a breakaway safety shut-off valve. While the actual nature of the invention covered herein can only be determined with reference to the claims appended hereto, certain forms of the invention that are characteristic of the embodiments disclosed herein are described briefly as follows.

One form of the present invention is directed to a safety shut-off valve including a valve housing and a detachable end portion connected to the valve housing by a region of reduced strength. A valve element is disposed within the valve housing and is displaceable between an open position and a closed position. A biasing element is engaged with the valve element to urge the valve element toward the closed position, and a retainer element is engaged between the valve element and the detachable end portion to initially maintain the valve element in the open position. An imposition of a force onto the detachable end portion results in at least partial detachment from the valve housing along the region of reduced strength, with such detachment causing at least a portion of the retainer element to disengage the detachable end portion to permit the biasing element to displace the valve element toward the closed position.

Another form of the present invention is directed to a safety shut-off valve including a valve housing having a passage defined by an inner periphery, and a detachable end portion connected to the valve housing by a region of reduced strength. A valve element is sized and shaped to be guidably displaced along the passage between an open position and a closed position. A biasing element engages the valve element to urge the valve element toward the closed position, and a retainer element is engaged between the valve element and the detachable end portion to initially maintain the valve element in the open position. An imposition of force onto the detachable end portion results in at least partial detachment from the valve housing along the region of reduced strength, with such detachment causing at least a portion of the retainer element to disengage the detachable end portion to permit the biasing element to displace the valve element toward the closed position.

Another form of the present invention is directed to a safety shut-off valve including a valve housing having an axial passage bound by an inner circumferential surface, and an annular valve seat extending inwardly from said inner circumferential surface. A detachable end portion is connected to the valve housing by a region of reduced strength and includes an annular shoulder positioned adjacent the region of reduced strength. A ball element sized in close tolerance with the inner circumferential surface is guidably displaceable along the axial passage between an open position and a closed position. A spring element is engaged between the valve housing and the ball element to urge the ball element toward the closed position, and a retainer element having a plurality of arm segments is disposed between the ball element and the detachable end portion with the plurality of arm segments abutting the annular shoulder to initially maintain the ball element in the open position. An imposition of force onto the detachable end portion results in at least partial detachment from the valve housing along the region of reduced strength, with such detachment causing at least one of the plurality of arm segments to disengage the annular shoulder to permit the spring element to displace the ball element toward the closed position.

It is one object of the present invention to provide an improved breakaway safety shut-off valve. Further objects, features, advantages, benefits, and aspects of the present invention will become apparent from the drawings and description contained herein.

DESCRIPTION OF THE PREFERRED EMBODIMENTS

Figure 1:
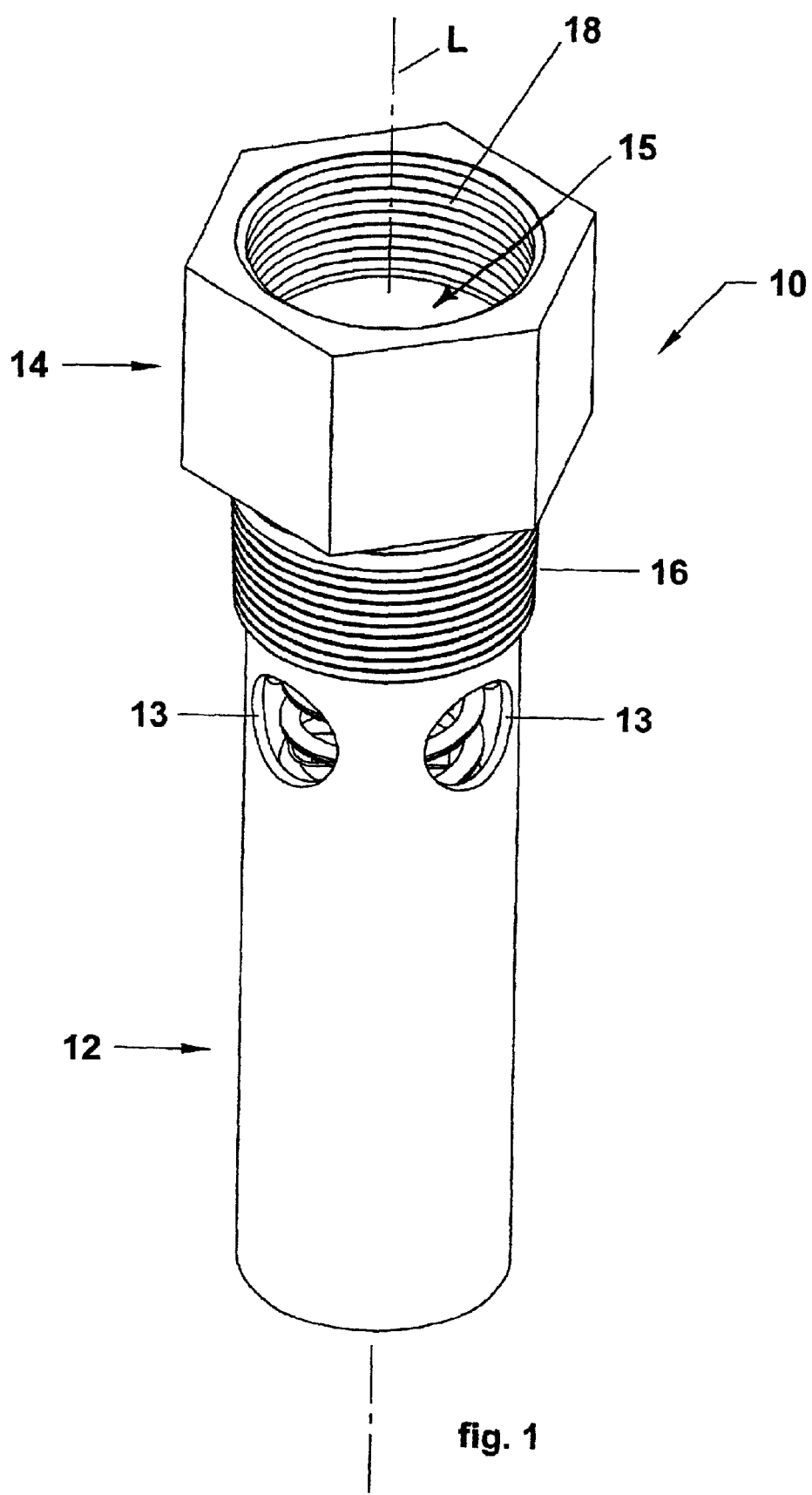
FIG. 1 is a perspective view of a breakaway safety shut-off valve according to one form of the present invention.

For the purposes of promoting an understanding of the principles of the invention, reference will now be made to the embodiments illustrated in the drawings and specific language will be used to describe the same. It will nevertheless be understood that no limitation of the scope of the invention is hereby intended and that alterations and modifications in the illustrated devices are contemplated, and that further applications of the principles of the invention as illustrated herein are also contemplated as would normally occur to one skilled in the art to which the invention relates.

Referring to FIG. 1, shown therein is a breakaway safety shut-off valve 10 according to one form of the present invention. The safety valve 10 extends generally along a longitudinal axis L and comprises a main body portion 12 and a detachable end portion 14. The detachable end portion 14 is connected to the main body portion 12 by a region of reduced strength.

The main body portion 12 serves as a housing to contain various valve components that function to provide automatic shut-off capability to the safety valve 10, the operation of which will become apparent below. The detachable end portion 14 is configured to be coupled to an external valve mechanism or another type of ancillary device. The safety valve 10 may be used in a variety of applications to couple such mechanisms/devices to a fluid and/or vapor source. In a preferred embodiment of the invention, each of the mechanisms/devices that could potentially sustain inadvertent or intentional damage is individually coupled to the fluid/vapor source via an individual safety valve 10. Notably, the imposition of a force onto the detachable end portion 14 will result in at least partial detachment of the end portion 14 from the valve housing 12 along the region of reduced strength, which will in turn result in automatic shut-off of the safety valve 10.

In a preferred embodiment of the invention, the valve housing 12 and the detachable end portion 14 cooperate to define a generally tubular or cylindrical shaped body extending along the longitudinal axis L. However, it should be understood that other suitable shapes and configurations of the safety valve 10 are also contemplated as falling within the scope of the present invention. The valve housing 12 preferably includes a number of lateral openings 13 that communicate with an axial passage 15 extending between the valve housing 12 and the detachable end portion 14. In a specific embodiment of the invention, the valve housing 12 defines four lateral openings 13 dispersed uniformly about the perimeter of valve housing 12. However, it should be understood that the valve housing 12 could define any number of lateral openings 13, including a single lateral opening 13. It should also be understood that the openings 13 need not necessarily extend in a lateral direction, but could alternatively extend in an axial direction.

The safety valve 10 is preferably adapted for coupling an external valve mechanism or ancillary device to the outer wall of a storage tank or container. In one embodiment of the invention, the safety valve 10 includes external threads 16 that are threadingly engagable with a corresponding threaded opening extending through the outer wall of the storage tank; however, it should be understood that other methods of engagement are also contemplated as would occur to one of ordinary skill in the art, such as, for example, by welding. In another embodiment of the invention, the detachable end portion 14 has a hexagonal configuration to aid in threading the external threads 16 along the threaded opening in the outer wall of the storage tank. However, other suitable configurations are also contemplated as would occur to one of ordinary skill in the art.

In a further embodiment of the invention, the detachable end portion 14 includes internal threads 18 that are threadingly engagable with a corresponding externally threaded portion of the external valve mechanism/ancillary device. However, it should be understood that the detachable end portion 18 could alternatively define external threads that are engagable with a corresponding internally threaded portion of the external valve mechanism/ancillary device. It should also be understood that other methods of engagement are also contemplated as would occur to one of ordinary skill in the art, such as, for example, by a compression fitting, a quick disconnect fitting, or other more permanent methods of engagement such as welding.

As will be discussed in further detail below, when the safety valve 10 is in an open configuration, gases and/or liquids are permitted to flow therethrough. However, the imposition of a sufficient force onto the detachable end portion 14 will cause the end portion 14 to become either partially or entirely detached from the valve housing 12. Such force may be a lateral force, an axial force, a rotational force (i.e., torque), or a combination of any of the above-mentioned forces. Detachment of the end portion 14 from the valve housing 12 will in turn cause the safety valve 10 to automatically shut-off via a shift to a closed configuration, in which case gases and/or liquids will be substantially prevented from flowing therethrough.

Figure 2:
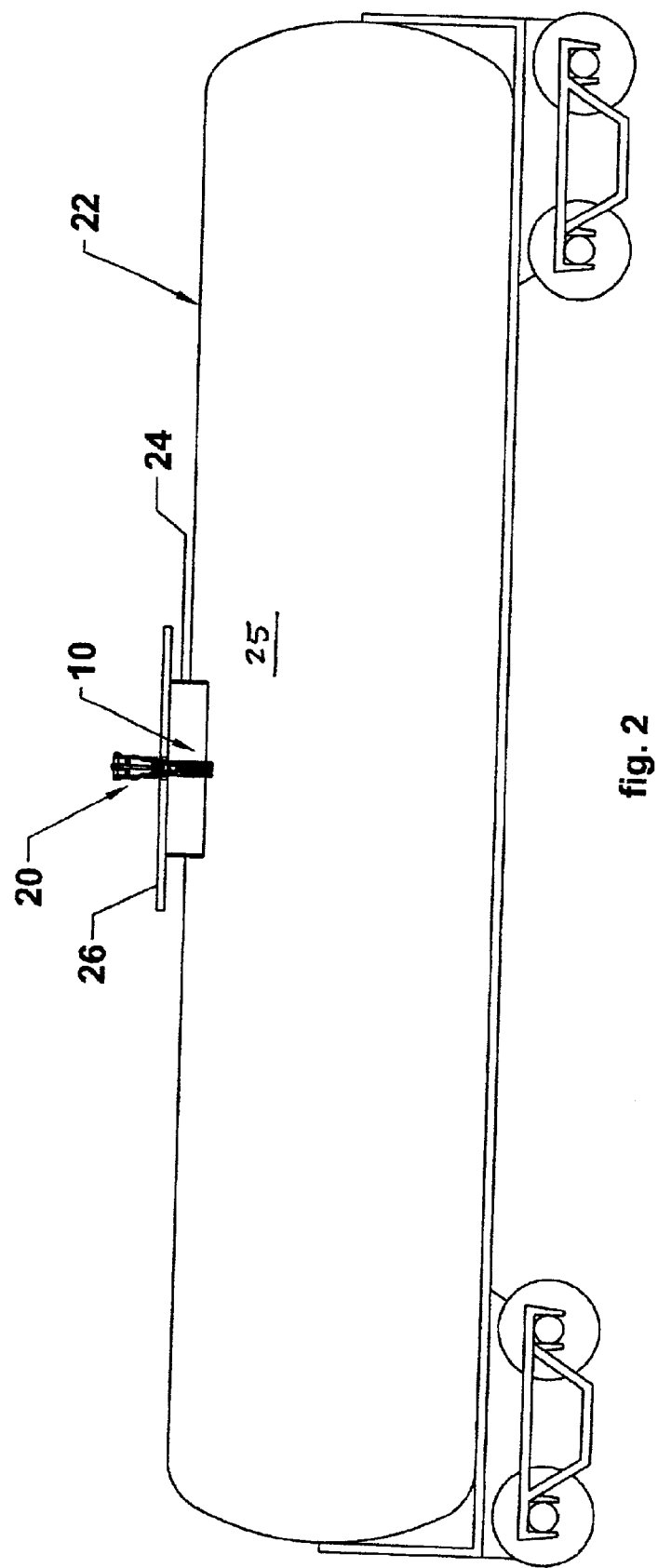
FIG. 2 is an elevational view of the breakaway safety shut-off valve illustrated in FIG. 1, as used in association with a railroad tank car.
Figure 3:
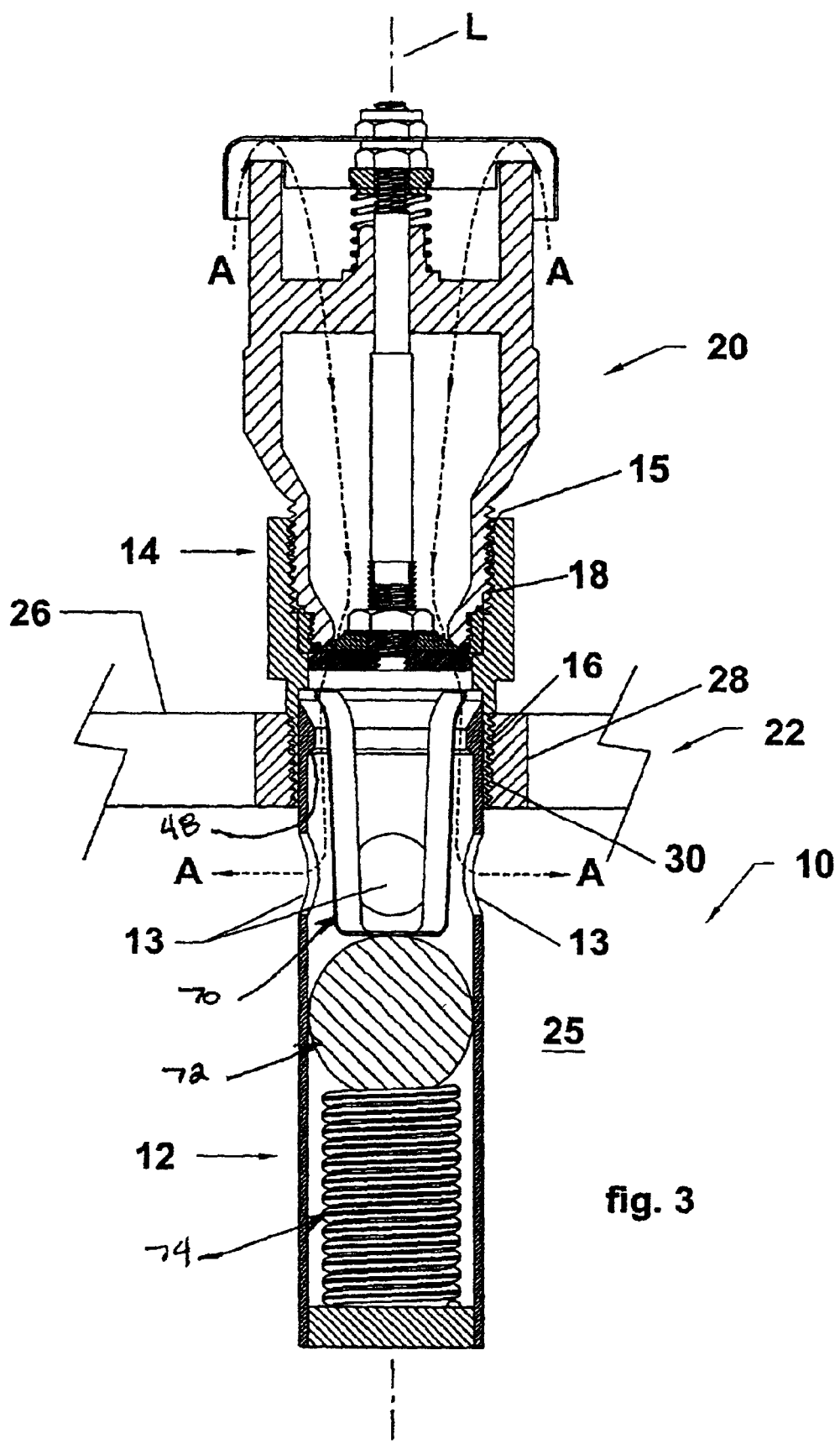
FIG. 3 is a partial sectional view of the breakaway safety shut-off valve illustrated in FIG. 1, as shown in an open configuration to provide open communication between a vacuum relief valve and the internal chamber of the railroad tank car.
Figure 4:
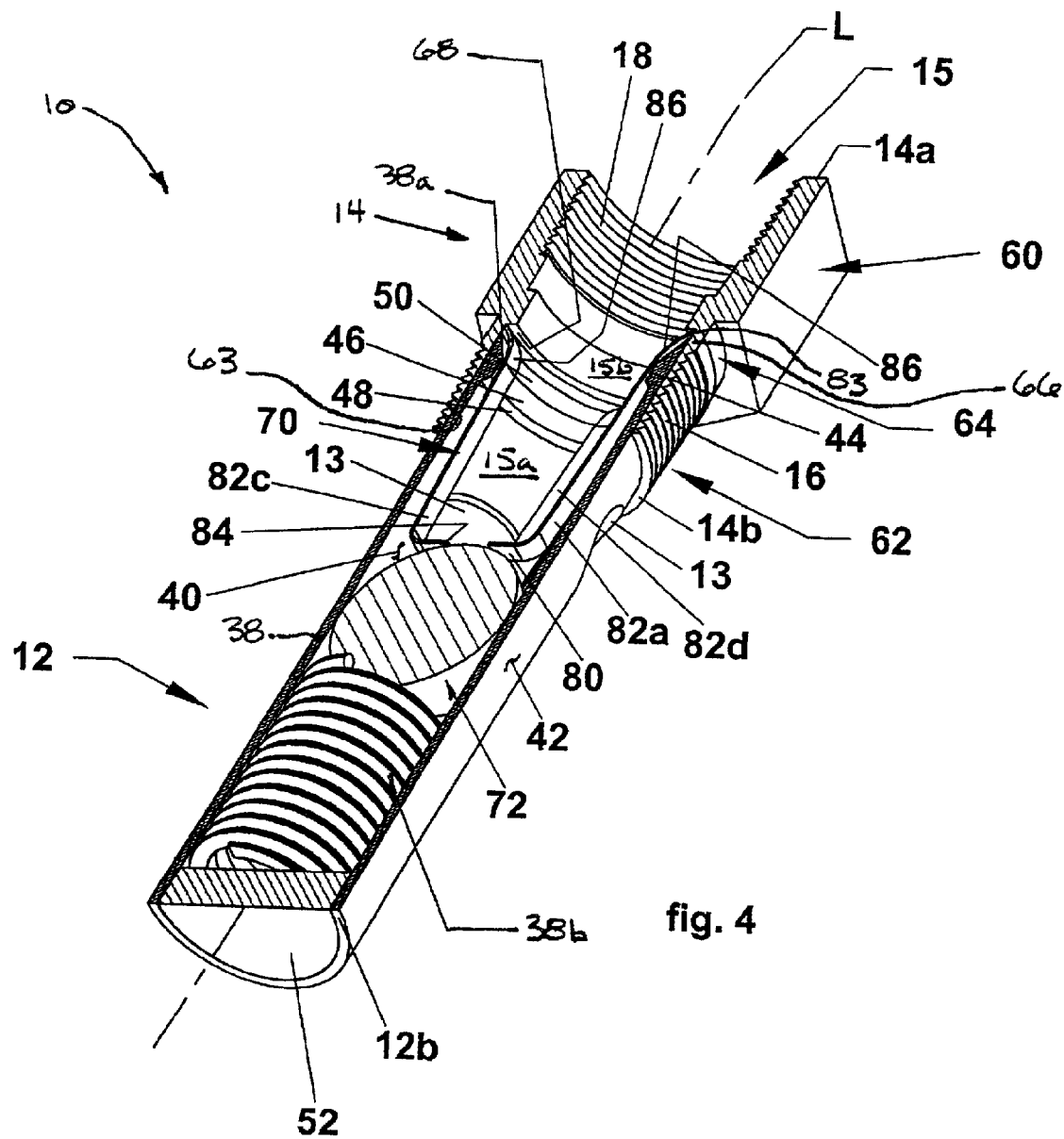
FIG. 4 is a partial sectional view, in perspective, of the breakaway safety shut-off valve illustrated in FIG. 1.

Referring to FIGS. 2 and 3, shown therein is the safety valve 10 as used in a particular application involving the coupling of a vacuum relief valve 20 to the outer wall of a railroad tank car 22. In the illustrated embodiment, the railroad tank car 22 includes a manway 24 that provides access to the inner chamber 25 of the tank car. The manway 24 is covered by a manway lid 26. As shown in FIG. 3, the manway lid 26 preferably includes an internally threaded coupling member 28 permanently affixed thereto. The coupling member 28 in turn defines internal threads 30 configured to threadingly engage the external threads 16 of the safety valve 10. In the illustrated embodiment of the invention, the safety valve 10 is installed in such a manner that only the detachable portion 14 extends above the outer surface of the manway lid 26, with the valve housing 12 being entirely disposed within the inner chamber 25 of the railroad tank car 22. However, other arrangements and mounting configurations of the safety valve 10 are also contemplated as falling within the scope of the present invention. Additionally, although the illustrated embodiment of the invention depicts the external valve 20 as being directly coupled to the detachable end portion 14 of safety valve 10, it should be understood that the external valve 20 could be coupled to the detachable end portion 14 by an intermediate coupling member, such as, for example, a pipe or tube.

As will become apparent, when the safety valve 10 is in an open configuration, communication is maintained between the vacuum relief valve 20 and the internal chamber 25 of the railroad tank car 22. More specifically, when the safety valve 10 is in an open configuration, air and/or liquid is permitted to flow through the valve generally along arrows A. Specifically, air and/or liquid is permitted to flow through an opening in the vacuum relief valve 20, along the axial passage 15, and through the lateral openings 13 to the internal chamber 25 to prevent the buildup of vacuum pressure within the railroad tank car 22. However, if the end portion 14 of safety valve 10 becomes either partially or entirely detached from the valve housing 12, the safety valve 10 will automatically shift to a closed configuration, thereby shutting off communication between the internal chamber 25 and the outer environment to prevent the escape of gasses and or fluids from the railroad tank car 22.

Although a specific application of the safety valve 10 is illustrated and described herein, it should be understood that the safety valve 10 may be used in a wide variety of applications. For example, the safety valve 10 may be used to provide selective communication between other types of valve mechanisms or ancillary devices and a fluid/vapor source. Such external mechanisms/devices may include, for example, fill valves, pressure relief valves, regulator valves, dispensing valves, or other types of mechanisms/devices as would be apparent to one of ordinary skill in the art. Additionally, the safety valve 10 may be used in conjunction with other types of storage tanks, such as, for example, cargo holding tanks on barges or other marine vessels, tanker trucks, aboveground storage containers, underground storage containers, or in conjunction with other types of tanks or containers as would be apparent to one of ordinary skill in the art. Furthermore, it should be understood that the safety valve 10 may be coupled directly to a fluid/vapor source, such as, for example, a pipe or tube configured to convey a liquid or gas.

Referring to FIGS. 4–7, further details regarding the safety valve 10 will now be described. The valve housing 12 extends generally along the longitudinal axis L and preferably has a cylindrical configuration including a tubular sidewall 38 extending between a proximal end 38a and a distal end 38b. However, other shapes and configurations of the valve housing 12 are also contemplated, including a square/rectangular configuration or other polygonal configurations. The sidewall 38 includes an inner peripheral surface 40 and an outer peripheral surface 42. The inner peripheral surface 40 defines a first portion 15a of the axial passage 15 extending generally along longitudinal axis L. The lateral openings 13 extend through the sidewall 38 and intersect the axial passage 15a.

The portion of the valve housing 12 adjacent the detachable end portion 14 defines a projection or protuberance 44 extending inwardly from the inner peripheral surface 40 of sidewall 38. The inward projection 44 preferably extends entirely about the inner periphery of sidewall 38 to define an annular projection 44. The annular projection 44 includes a central portion 46 extending generally along the longitudinal axis L, a first tapered portion 48 extending between central portion 46 and inner surface 40, and a second tapered portion 50 extending between central portion 46 and proximal end 38a of sidewall 38. As will become apparent below, the tapered portion 48 serves as a valve seat configured to sealing engage a valve element to substantially prevent flow through the safety valve 10. Although the surface of valve seat 48 is preferably arranged at an oblique angle relative to longitudinal axis L, it should be understood that the surface of valve seat 48 could alternatively be oriented substantially perpendicular to longitudinal axis L.

The distal end 38b of sidewall 38 is preferably closed off by an end wall 52. In one embodiment of the invention, the end wall 52 is configured as an inner plug. However, it should be understood that an outer cap could alternatively be used to close off distal end 38b. The inner plug 52 is attached to the sidewall 38 by any suitable method, such as, for example, by welding, threading, fastening, or any other method of connection known to one of ordinary skill in the art. Alternatively, the sidewall 38 and the plug 52 could be formed as a unitary structure.

The detachable end portion 14 extends generally along longitudinal axis L between a first end 14a and a second end 14b. The detachable end portion 14 is generally comprised of a first end portion 60, a second end portion 62, and an intermediate portion 64 interconnecting the first and second end portions 60, 62. As will be discussed in further detail below, the intermediate portion 64 serves as a region of reduced strength to allow at least partial detachment of the first end portion 60 from the second end portion 62.

As discussed above, the end portion 60 preferably has a hexagonal configuration to aid in threading the safety valve 10 into a corresponding threading opening in a tank wall. Such a configuration provides at least one pair of opposing flats 61a, 61b (FIGS. 5 and 6) that provide a convenient and effective means for gripping the end portion 60 with a wrench or a similar type of tool to impart rotational movement thereto. As also discussed above, the end portion 60 preferably includes internal threads 18 configured to engage a corresponding externally threaded portion of a valve mechanism/ancillary device.

The second end portion 62 preferably has a tubular configuration, including an annular sidewall defining an externally threaded outer surface 16 and an inner surface 63 corresponding to the outer surface 42 of valve housing 12. As discussed above, the external threads 16 are configured to engage a corresponding threaded opening extending through the outer wall of a storage tank. The inner surface 63 preferably defines a diameter sized in close tolerance with the diameter of the outer surface 42 of valve housing 12. The end portion 62 is slid over the open end of valve housing 12 and is attached thereto by any suitable method, such as, for example, by welding, threading, fastening, or any other method of connection known to one of ordinary skill in the art. Preferably, the end portion 62 is attached to the valve housing 12 in such a manner as to provide a fluid-tight connection for applications involving liquids, or an air-tight connection for applications involving gases. However, it should be understood that the detachable end portion 14 and the valve housing 12 could alternatively be formed as a unitary structure, with the end portion 62 being formed integral with the sidewall 38.

Figure 8:
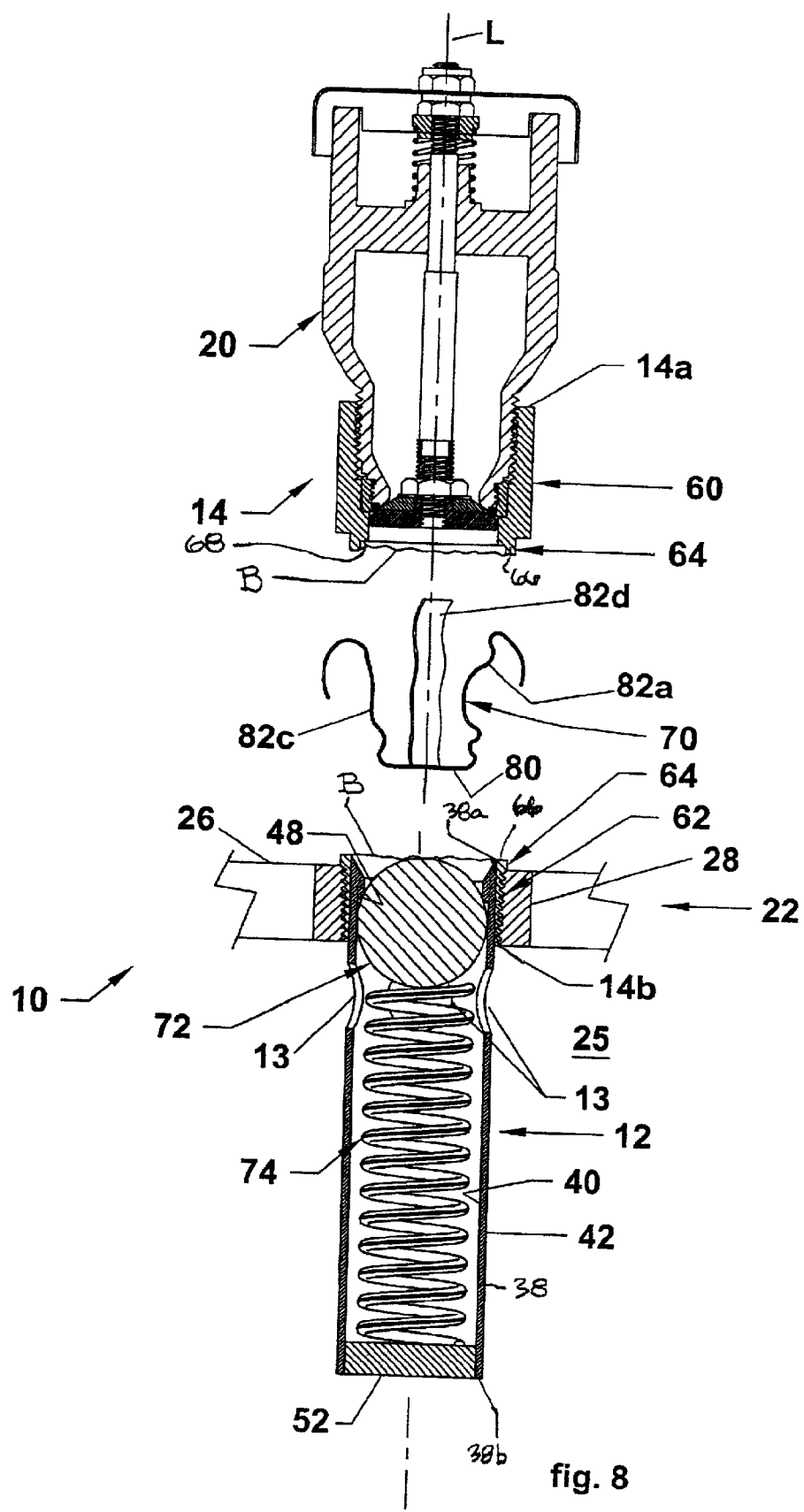
FIG. 8 is a partial sectional view of the breakaway safety shut-off valve illustrated in FIG. 1, as shown in a closed configuration to shut off communication between the vacuum relief valve and internal chamber of the railroad tank car.

The intermediate portion 64 preferably has a tubular configuration, including an annular sidewall 66 extending between and interconnecting the end portions 60, 62. The intermediate portion 64 serves as a region of reduced strength or structural weakness. This region of reduced strength facilitates at least partial detachment or separation of the end portion 60 from the end portion 62 upon imposition of a sufficient force onto the end portion 60. In a preferred embodiment of the invention, such detachment results from fracturing of the intermediate portion 64 along a break line B (FIG. 8). In one embodiment of the invention, the sidewall 66 of intermediate portion 64 has a thickness less than the sidewall thickness of end portion 60, and less than the combined sidewall thickness of end portion 62 and valve housing 12. As a result of this reduced/narrowed cross-section, the structural integrity or strength of the intermediate portion 64 is less than that of the adjacent portions of end portions 60, 62. Such an arrangement facilitates fracturing of the intermediate portion 64 along the break line B. In another embodiment of the invention, the inner and/or outer surface of sidewall 66 may be scored to provide a region of reduced strength. In yet another embodiment, an annular groove may be formed along the inner and/or outer surface of sidewall 66 to provide a region of reduced strength. In still another embodiment, the intermediate portion 64 may be formed of a frangible material to facilitate fracturing along the break line B.

The detachable end portion 14 defines a second portion 15b of the axial passage 15 extending generally along longitudinal axis L. Axial passage 15b extends between end 14a of detachable end portion 14 and end 38a of valve housing sidewall 38. A shoulder 68 is defined along the axial passage 15b at a location adjacent the region of reduced strength 64. Preferably, the shoulder 68 extends about the entire inner periphery of axial passage 15b to define an annular shoulder 68. Although the annular shoulder 68 is illustrated as extending in a direction perpendicular to the longitudinal axis L, it should be understood that the annular shoulder 68 could alternatively be oriented at an oblique angle relative to longitudinal axis L. As will be discussed below, the annular shoulder 68 cooperates with a retainer element to initially maintain the safety valve 10 in an open configuration.

The valve housing 12 contains various valve components, including a retainer element 70, a valve element 72, and a biasing element 74. As will be discussed in further detail below, the valve element 72 is displaceable between an open position and a closed position. Additionally, the biasing element 74 serves to urge the valve element 72 toward the closed position, while the retainer element 70 is engaged between the valve element 72 and the detachable end portion 14 to initially maintain the valve element 72 in an open position. Although the valve element 72 is preferably position in sealing contact with the valve seat 48 when in the closed position, it should be understood that a perfect seal is not necessarily required.

The valve element 72 is configured for displacement along the inner surface 40 of axial passage 15a. In a preferred embodiment of the invention, the valve element 72 is a spherical-shaped ball. Preferably, the outer diameter of the ball 72 is sized in close tolerance with the inner diameter of the circumferential surface 40 of valve housing 12 to guide the ball 72 along the axial passage 15a. Although the valve element 72 has been illustrated and described as a spherical-shaped ball, it should be understood that other types and configurations of valve elements are also contemplated, such as, for example, a plate or disc-shaped element, a piston-shaped element, or other poppet-like devices known to those of ordinary skill in the art.

The biasing element 74 is sized for disposition within the axial passage 15a and is engaged between the housing end wall 52 and the ball 72 to urge the ball 72 toward a closed position in abutment against the valve seat 48. In one embodiment of the invention, the biasing element 74 is a compression spring. In a more specific embodiment, the biasing element 74 is a coil spring. However, it should be understood that other types and configurations of springs are also contemplated as falling within the scope of the present invention. It should also be understood that other types of biasing devices are contemplated as falling within the scope of the present invention, including any type of device or mechanism capable of urging the ball 72 toward the valve seat 48.

The retainer element 70 is engaged between the ball 72 and the detachable end portion 14 to initially maintain the ball 72 in an open position remote from the valve seat 48. In one embodiment of the invention, the retainer element 70 includes a base portion 80 engaged against the ball 72, and a plurality of arm segments 82a, 82b, 82c, 82d extending from the base portion 80. Each of the arm segments 82a–82d includes a distal end 83 engaged in abutment against the annular shoulder 68 of detachable end portion 14 adjacent the region of reduced strength 64.

Figure 5:
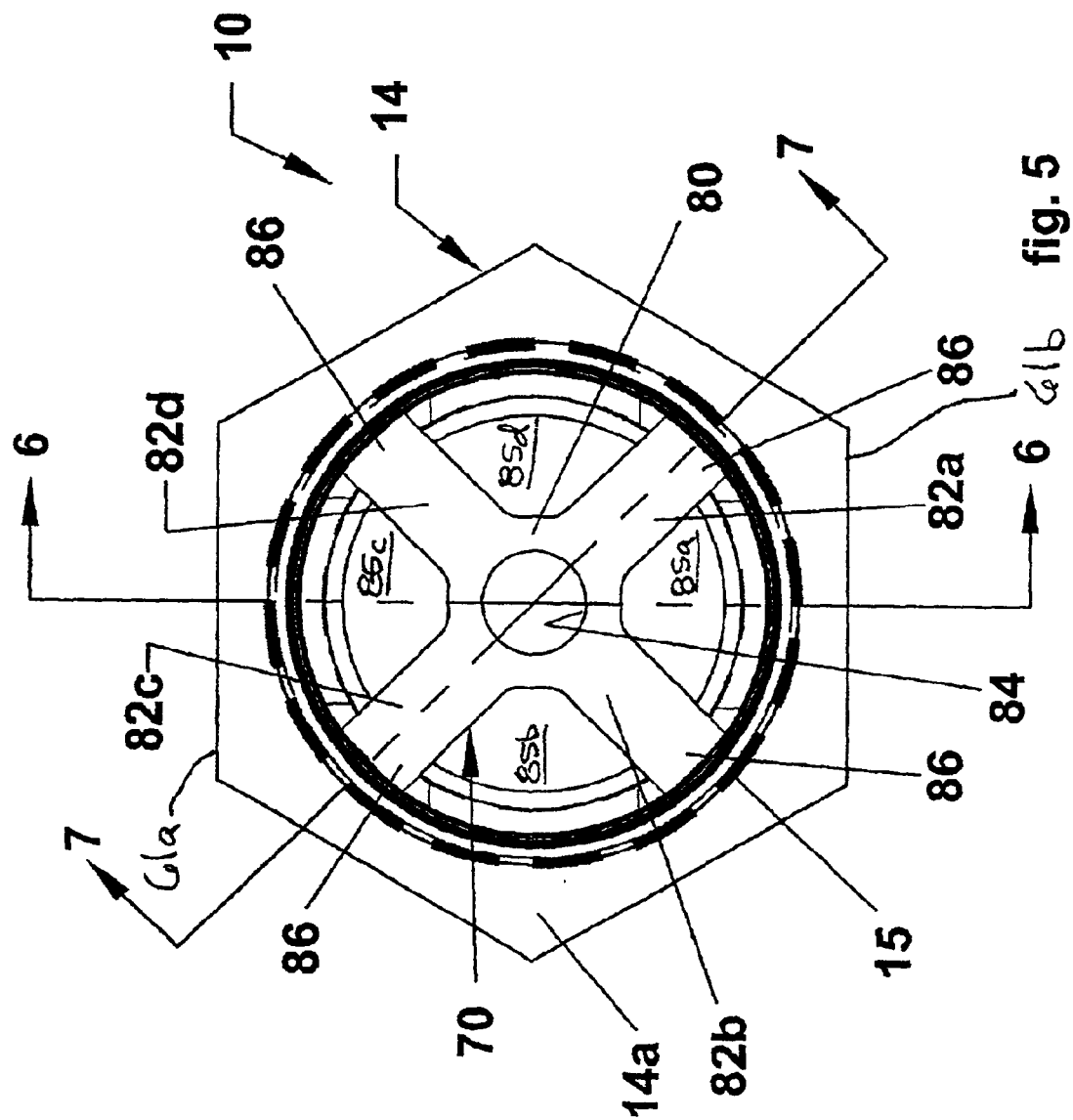
FIG. 5 is a top view of the breakaway safety shut-off valve illustrated in FIG. 1.
Figure 6:
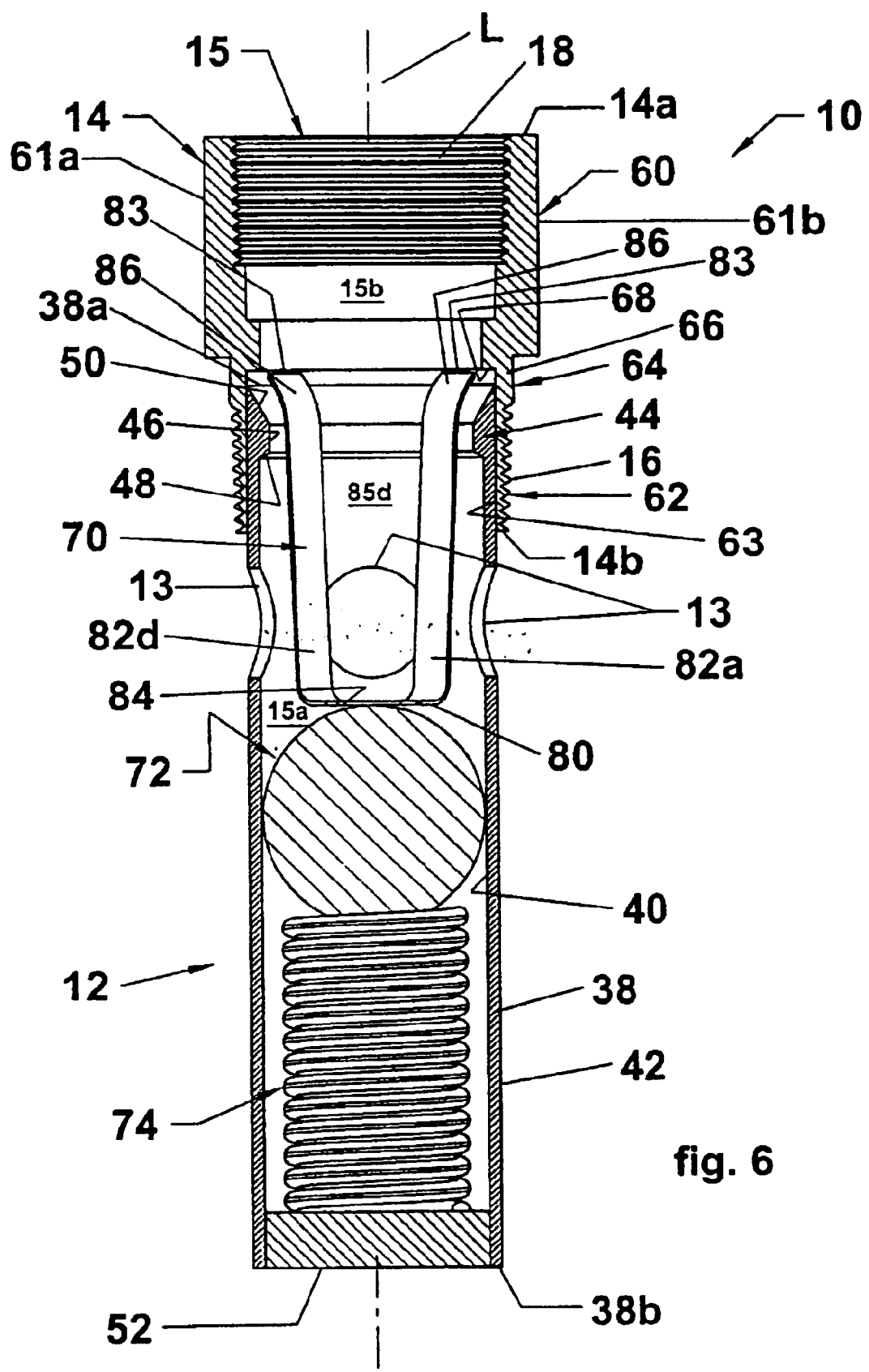
FIG. 6 is a partial sectional view of the breakaway safety shut-off valve illustrated in FIG. 5, taken along line 6—6 of FIG. 5.
Figure 7:
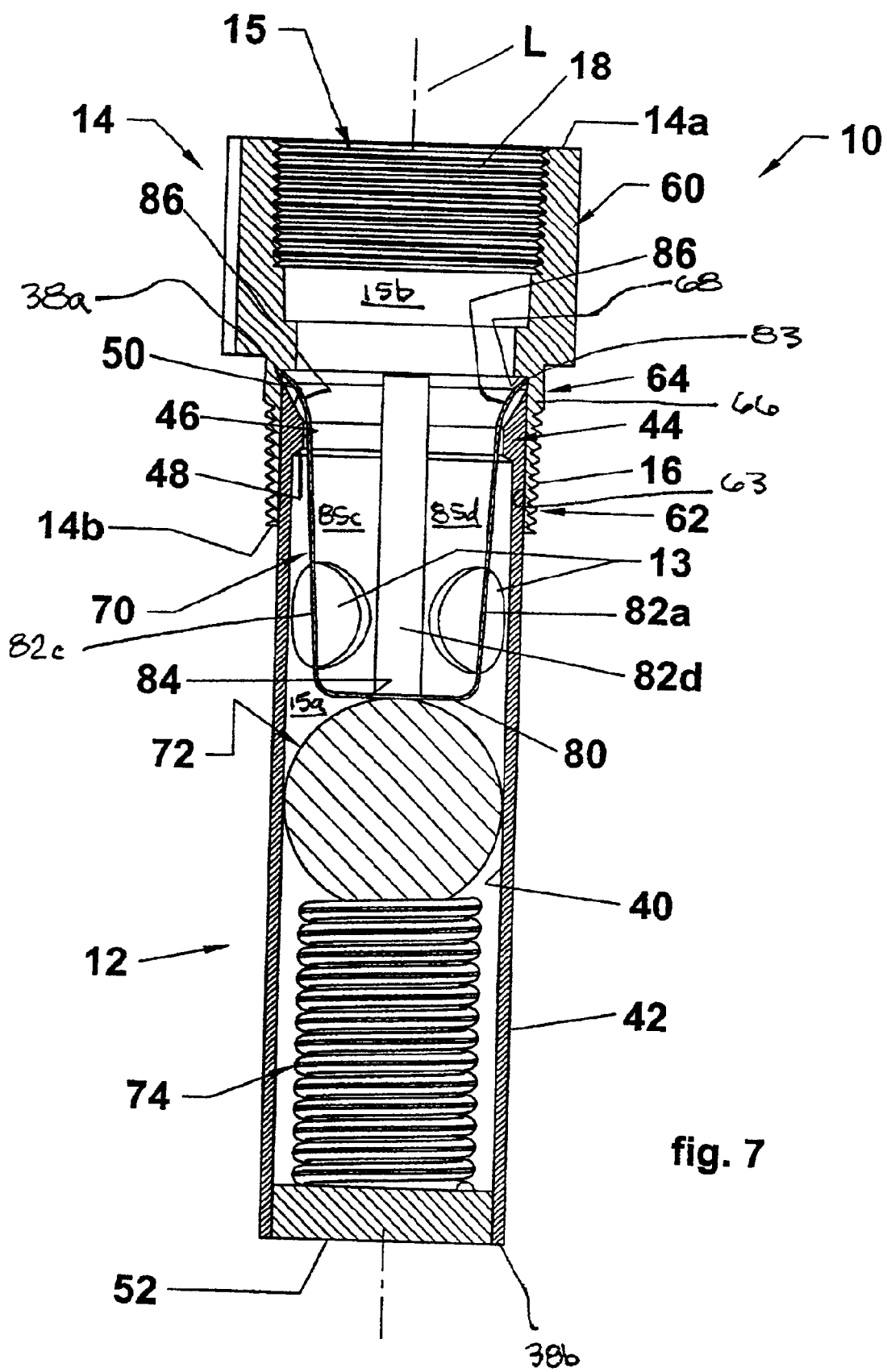
FIG. 7 is a partial sectional view of the breakaway safety shut-off valve illustrated in FIG. 5, taken along line 7—7 of FIG. 5.

The base portion 80 preferably includes a central opening 84 sized to receive a portion of the ball 72 therein to aid in maintaining the retainer element 70 in its proper position and orientation relative to ball 72. The arm segments 82a–82d preferably have a relatively thin wall thickness. Additionally, the arm segments 82a–82d are preferably positioned uniformly about the base portion 80 with the distal ends 83 disposed uniformly about the periphery of the annular shoulder 68 to define a cup-like configuration. The arm segments 82a–82d are preferably spaced apart in such a manner as to define a number of openings 85a–85d therebetween (FIGS. 5–7). The openings 85a–85d provide a pathway that permits fluid/gas to flow between the axial passage 15 and the lateral openings 13. The distal end portions 86 of the arm segments 82a–82d preferably define an outward flare or taper configured to wrap around the inward projection 44 of valve housing 12. Such an outward flare tends to position the distal ends 83 of the arm segments 82a–82d in close proximity with the corner of the detachable end portion 14 formed at the intersection of the inner surface 63 and the annular shoulder 68.

The arm segments 82a–82d are configured to have a predetermined load-bearing strength. As a result of such predetermined load-bearing strength, should one or more of the distal ends 83 of the arm segments 82a–82d become disengaged from the annular shoulder 86, the arm segments remaining in engagement with the shoulder 86 will tend to collapse under the compression force exerted by the spring 74. In other words, the load-bearing strength of the arm segments remaining in engagement with shoulder 86 is insufficient to oppose the compression force exerted by spring 74. As will be discussed in further detail below, the arm segments remaining in engagement with shoulder 86 will deform to permit the spring 74 to displace the ball 72 toward the valve seat 48. In one embodiment of the invention, such deformation comprises buckling or crumpling under the compression force exerted by the spring 74. However, other forms of deformation are also contemplated as falling with the scope of the present invention, such as, for example, folding, bending, twisting or any other type of deformation that would occur to one of skill in the art.

Although a specific embodiment of the retainer element 70 is illustrated and described herein, it should be understood that other embodiments are also contemplated. For example, although the retainer element 70 has been illustrated and described as including four arm segments 82a–82d, it should be understood that the retainer element 70 may include any number of arm segments, including two arm segments, three arm segments, or five or more arm segments. It should also be understood that the retainer element 70 could alternatively include a substantially continuous sidewall to define a cup shape. It should further be understood that other shapes and configurations of openings 85a–85d are also contemplated to provide a flow pathway through the safety valve 10. It should likewise be understood that although the retainer element 70 and the valve element 72 are illustrated and described as comprising separate elements, elements 70, 72 could alternatively be formed as a unitary structure.

Having described the structural features of the safety valve 10, further details regarding the operation of safety valve 10 will now be discussed. Referring once again to FIG. 3, shown therein is the safety valve 10 in an open configuration. When the safety valve 10 is in the open configuration, flow communication is maintained between the vacuum relief valve 20 and the internal chamber 25 of the railroad tank car 22. Specifically, when the safety valve 10 is in an open configuration, the retainer element 70 opposes the compression force exerted by the spring 74 to maintain the ball 72 in a position remote from the valve seat 48. Notably, when in the open configuration, the lateral openings 13 extending through the valve housing 12 are disposed between the ball 72 and the valve seat 48 to provide an open flowpath through the safety valve 10. During normal conditions, the safety valve 10 will remain in the open configuration to permit gases and/or liquids to flow therethrough.

Referring now to FIG. 8, shown therein is the safety valve 10 in a closed configuration. When the safety valve 10 is in the closed configuration, flow communication is cut-off between the internal chamber 25 of the railroad tank car 22 and the surrounding environment to substantially prevent the escape of gasses and/or fluids from the railroad tank car 22. As discussed above, upon exertion of a sufficient force onto the vacuum relief valve 20 and/or the detachable end portion 14, the end portion 14 will become either partially or entirely detached from the valve housing 12 at location adjacent the region of reduced strength 64. Such detachment will in turn automatically trigger a shut-off condition of the safety valve 10.

Should the detachable end portion 14 become entirely detached from the valve housing 12 along break line B, the retainer element 70 will completely disengage the shoulder 68 of the detachable end portion 14 and the retainer element 70 will be expelled from the valve housing 12. Expulsion of the retainer element 70 from the valve housing 12 will in turn permit the spring 74 to displace the ball 72 toward the closed position and into sealing contact with the valve seat 48, thereby closing the safety valve 10 and substantially preventing the flow of fluids and/or gases therethrough. The relatively close tolerance between the ball 72 and the inner surface 42 of valve housing 12 serves to guide the ball 72 along the axial passage 15a and into proper engagement with the valve seat 48. Notably, such an arrangement eliminates the need for an auxiliary guiding device to ensure proper seating of the ball 72 against the valve seat 48.

Should the detachable end portion 14 become only partially separated from the valve housing 12 along break line B, such partial separation will cause the distal end 83 of at least one of the arm segments 82a–82d to disengage the annular shoulder 68. Since the distal end portions 86 of arm segments 82a–82d are flared or tapered in an outward direction, even a relatively slight fracture along the region of reduced strength 64 will create a gap of sufficient size to cause the distal end 83 to disengage the annular shoulder 68. As discussed above, disengagement of one or more of the arm segments 82–82d from the annular shoulder 68 will cause the arm segments remaining in engagement with shoulder 68 to collapse under the compression force exerted by the spring 74. The collapse of the retainer element 70 in turn permits the spring 74 to displace the ball 72 along the axial passage 15 toward the closed position and into abutment against the valve seat 48, thereby closing the safety valve 10 and substantially preventing the flow of fluids and/or gases therethrough.

While the invention has been illustrated and described in detail in the drawings and foregoing description, the same is to be considered as illustrative and not restrictive in character, it being understood that only the preferred embodiments have been shown and described and that all changes and modifications that come within the spirit of the invention are desired to be protected.

What is claimed is:

1. A safety shut-off valve, comprising:

a valve housing;

a detachable end portion connected to said valve housing by a region of reduced strength;

a valve element disposed within said valve housing and being displaceable between an open position that permits flow through the valve and a closed position that substantially prevents flow through the valve;

a biasing element engaged with said valve element to urge said valve element toward said closed position; and a retainer element disposed within said valve housing and including a plurality of arm segments engaged against said detachable end portion adjacent said region of reduced strength to initially maintain said valve element in said open position; and wherein imposition of a force onto said detachable end portion results in at least partial detachment from said valve housing along said region of reduced strength, said at least partial detachment causing at least one of said plurality of arm segments to disengage said detachable end portion, said disengagement of said at least one of said plurality of arm segments from said detachable end portion causing deformation of said plurality of arm segments remaining in engagement with said detachable end portion to permit said biasing element to displace said valve element toward said closed position.

2. The safety shut-off valve of claim 1, wherein said detachable end portion includes a shoulder extending about an inner periphery adjacent said region of reduced strength, said plurality of arm segments abutting said shoulder to initially maintain said valve element in said open position, said at least partial detachment causing at least one of said plurality of arm segments to disengage said shoulder to permit said biasing element to displace said valve element toward said closed position.

3. The safety shut-off valve of claim 2, wherein said shoulder extends entirely about said inner periphery to define an annular shoulder.

4. The safety shut-off valve of claim 1, wherein said retainer element includes at least three of said arm segments positioned uniformly about said inner periphery.

5. The safety shut-off valve of claim 4, wherein said retainer element includes four of said arm segments positioned uniformly about said inner periphery.

6. A safety shut-off valve, comprising:

a valve housing;

a detachable end portion connected to said valve housing by a region of reduced strength;

a valve element disposed within said valve housing and being displaceable between an open position that permits flow through the valve and a closed position that substantially prevents flow through the valve;

a biasing element engaged with said valve element to urge said valve element toward said closed position; and a retainer element disposed within said valve housing and engaged between said valve element and said detachable end portion to initially maintain said valve element in said open position; and wherein imposition of a force onto said detachable end portion results in at least partial detachment from said valve housing along said region of reduced strength, said at least partial detachment causing at least a portion of said retainer element to disengage said detachable end portion, and wherein said disengagement of said at least a portion of said retainer element from said detachable end portion causes deformation of said retainer element to permit said biasing element to displace said valve element toward said closed position.

7. The safety shut-off valve of claim 6, wherein said deformation comprises buckling.

8. The safety shut-off valve of claim 6, wherein said at least partial detachment of said detachable end portion from said valve housing is caused by fracturing along said region of reduced strength.

9. The safety shut-off valve of claim 6, wherein said region of reduced strength is formed by a groove extending about an outer periphery of said detachable end portion.

10. The safety shut-off valve of claim 6, wherein said region of reduced strength is formed by a narrowed wall thickness.

11. The safety shut-off valve of claim 6, wherein said retainer element has a cup-like configuration.

12. A safety shut-off valve, comprising:

a valve housing;

a detachable end portion connected to said valve housing by a region of reduced strength;

a valve element disposed within said valve housing and being displaceable between an open position that permits flow through the valve and a closed position that substantially prevents flow through the valve;

a biasing element engaged with said valve element to urge said valve element toward said closed position; and a retainer element disposed within said valve housing and including a plurality of arm segments engaged against said detachable end portion adjacent said region of reduced strength to initially maintain said valve element in said open position; and wherein imposition of a force onto said detachable end portion results in complete detachment from said valve housing along said region of reduced strength, said complete detachment causing said retainer element to disengage said detachable end portion to allow expulsion of said retainer element from said valve housing and permit said biasing element to displace said valve element toward said closed position.

13. A safety shut-off valve, comprising:

a valve housing including a passage defined by an inner periphery;

a detachable end portion connected to said valve housing by a region of reduced strength;

a valve element sized and shaped to be guidably displaced by said inner periphery along said passage between an open position that permits flow through the valve and a closed position that substantially prevents flow through the valve, said valve element comprising a spherical-shaped ball;

a biasing element engaged with said valve element to urge said valve element toward said closed position;

a retainer element engaged between said valve element and said detachable end portion to initially maintain said valve element in said open position; and wherein imposition of a force onto said detachable end portion results in at least partial detachment from said valve housing along said region of reduced strength, said at least partial detachment causing at least a portion of said retainer element to disengage said detachable end portion to permit said biasing element to displace said valve element toward said closed position.

14. The safety shut-off valve of claim 13, wherein said inner periphery has a substantially circular cross-section.

15. The safety shut-off valve of claim 14, wherein said substantially circular cross section defines an inner diameter, said ball defining an outer diameter sized in close tolerance with said inner diameter.

16. The safety shut-off valve of claim 13, wherein said passage extends along an axis, said valve housing defining at least one lateral opening in communication with said passage, said at least one lateral opening disposed between said valve element and said detachable end portion when said valve element is in said open position to permit flow between said passage and said at least one lateral opening.

17. The safety shut-off valve of claim 13, wherein a portion of the valve adjacent said region of reduced strength defines external threads engagable with a corresponding threaded opening in a tank wall with said region of reduced strength positioned adjacent an exterior surface of said tank wall.

18. The safety shut-off valve of claim 17, wherein said detachable end portion comprises at least two flats to aid in threading the valve into said threaded opening in said tank wall.

19. The safety shut-off valve of claim 18, wherein said detachable end portion has a hexagonal configuration.

20. The safety shut-off valve of claim 13, wherein said retainer element includes a plurality of arm segments engaged against said detachable end portion adjacent said region of reduced strength to initially maintain said valve element in said open position, said at least partial detachment causing at least one of said plurality of arm segments to disengage said detachable end portion to permit said biasing element to displace said valve element toward said closed position.

21. The safety shut-off valve of claim 20, wherein said detachable end portion includes a shoulder extending about an inner periphery thereof adjacent said region of reduced strength, said plurality of arm segments abutting said shoulder to initially maintain said valve element in said open position, said at least partial detachment causing at least one of said plurality of arm segments to disengage said shoulder to permit said biasing element to displace said valve element toward said closed position.

22. A safety shut-off valve, comprising:

a valve housing including an axial passage bound by an inner circumferential surface, and an annular valve seat extending inwardly from said inner circumferential surface;

a detachable end portion connected to said valve housing by a region of reduced strength and including an annular shoulder disposed adjacent said region of reduced strength;

a ball element sized in close tolerance with said inner circumferential surface and being guidably displaceable along said axial passage between an open position remote from said valve seat and a closed position abutting said valve seat;

a spring element engaged between said valve housing and said ball element to urge said ball element toward said closed position; and a retainer element including a plurality of arm segments, said retainer element being disposed between said ball element and said detachable end portion with said plurality of arm segments abutting said annular shoulder to initially maintain said ball element in said open position; and wherein imposition of a force onto said detachable end portion results in at least partial detachment from said valve housing along said region of reduced strength, said at least partial detachment causing at least one of said plurality of arm segments to disengage said annular shoulder to permit said spring element to displace said ball element toward said closed position.

23. The safety shut-off valve of claim 22, wherein said valve housing includes at least one lateral opening in communication with said axial passage and positioned between said ball element and said valve seat when said ball element is in said open position.

24. The safety shut-off valve of claim 22, wherein said retainer element includes four of said arm segments positioned uniformly about said annular shoulder.

25. The safety shut-off valve of claim 22, wherein said disengagement of said at least one of said plurality of arm segments from said annular shoulder causes deformation of said plurality of arm segments remaining in engagement with said annular shoulder to permit said spring element to displace said bail element toward said closed position.

26. The safety shut-off valve of claim 25, wherein said deformation comprises buckling.

27. The safety shut-off valve of claim 22, wherein said imposition of force onto said detachable end portion results in complete detachment from said valve housing along said region of reduced strength, said complete detachment causing said retainer element to disengage said detachable end portion to allow expulsion of said retainer element from said valve housing and permit said biasing element to displace said valve element toward said closed position.

* * * * *